(No Model.)
G. W. ALTAFFER.
Harrow.
No. 235,484. Patented Dec. 14, 1880.
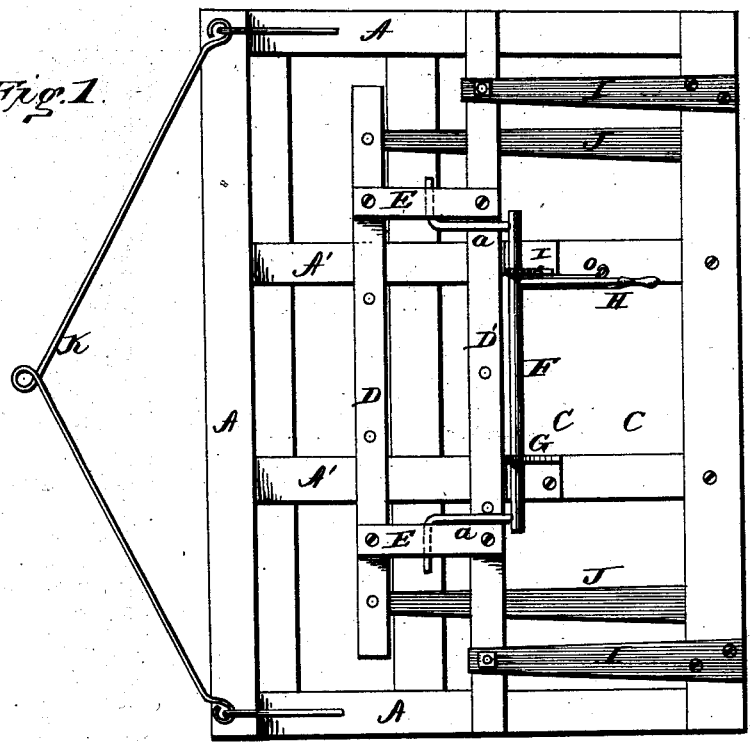
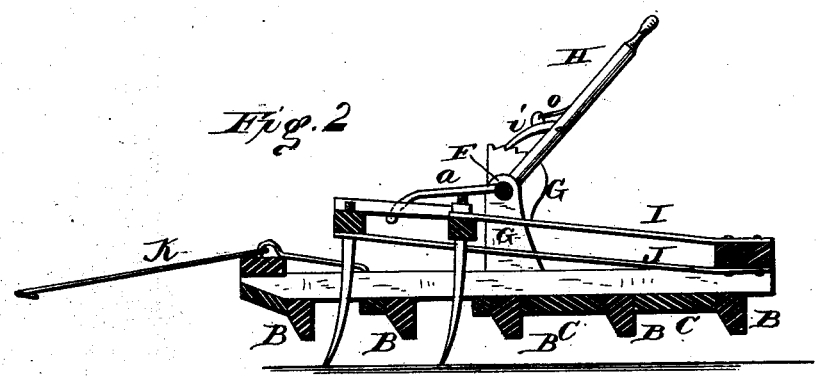
Witnesses.
Franck L. Ourand
J. J. McCarthy
Inventor,
George W. Altaffer
By Alexander Mason

UNITED STATES PATENT OFFICE.

GEORGE W. ALTAFFER, OF CROSS KEYS, VIRGINIA.

HARROW.

SPECIFICATION forming part of Letters Patent No. 235,484, dated December 14, 1880.

Application filed September 30, 1880. (No model.)

*To all whom it may concern:*

Be it known that I, GEORGE W. ALTAFFER, of Cross Keys, in the county of Rockingham, and in the State of Virginia, have invented certain new and useful Improvements in Harrows; and I do hereby declare that the following is a full, clear, and exact description thereof, reference being had to the accompanying drawings, and to the letters of reference marked thereon, making a part of this specification.

The nature of my invention consists in the combination of a drag and harrow in such manner that the teeth of the harrow will pass through slots in the drag, the harrow-frame being connected to the drag-frame by means of springs and controlled vertically by a suitable lever, as will be hereinafter more fully described.

To enable those skilled in the art to make and use my invention, I will now proceed to describe its construction and operation.

In the accompanying drawings, making a part of this specification, Figure 1 represents a plan view, and Fig. 2 a side view.

In the figures, A represents the frame of the drag, and A' A' two cross-ties of said frame. To the under side of the frame A are secured a series of drag or leveling bars, B B, the front faces of which are beveled, as represented in Fig. 2. The spaces between the rear bars, B, of the frame are filled with suitable boards, which run from one side of the frame A to the other and form a platform upon which a driver's seat is erected but not here shown. The spaces between the bars B on the forward portion of the frame are not closed, but are left open in order that the harrow-teeth may protrude through them.

D and D' and E E represent the harrow-frame. To the bars D D' of this frame are secured the harrow-teeth, which protrude through the spaces in the drag-frame.

I and J are springs, made of flat metal, which connect the harrow to the drag. The springs I I are secured to the top of the rear bar, A, of the drag-frame, and then pass forward and are secured at their front ends to the upper side of the bar D', while the springs J J are secured at their rear ends to the under side of the said bar A, and, passing forward, have their forward ends secured to the under side of the harrow-bar D.

F represents a shaft, which lies partially across the frame A, and which has bearings in the standards G G. Connected to this shaft are two elbow-levers, *a a*, and a lever, H. The bent arms of these levers lie under the bars E E, and by the use of the lever H these arms are made to lift the harrow so as to clear the teeth from any clogging material which may collect in them.

Upon one of the standards G is formed a rack or toothed segment and a pawl, *i*, which is pivoted to the lever H, and is adapted to catch into said rack in order to hold the harrow up when suspended. A rod, *o*, connected to lever H, serves to operate the pawl when necessary.

The bars B B, it will be seen, answer the purpose of breaking the clods, as also for leveling and smoothing the earth over which it passes. K represents the draft-rod of the implement.

Having thus fully described my invention, what I claim as new, and desire to secure by Letters Patent, is—

1. In combination with the drag-frame A, the harrow-frame D D' E, connected to the drag-frame by means of the springs I J, the springs I extending from the upper side of the rear transverse beam of the drag-frame to the upper part of the rear transverse beam of the harrow-frame, and the springs J from the under side of the rear beam of the drag-frame to the under side of the forward beam of the harrow-frame, substantially as specified.

2. The combination of the frame A and the frame D D' E, springs I and J, and the shaft F, with its levers and pawls, and the standard G, with its rack-bar, substantially as and for the purpose set forth.

In testimony that I claim the foregoing I have hereunto set my hand this 22d day of September, 1880.

G. W. ALTAFFER.

Witnesses:
C. M. ALEXANDER,
H. AUBREY TOULMIN.